United States Patent
Soliman et al.

(10) Patent No.: US 7,695,401 B2
(45) Date of Patent: Apr. 13, 2010

(54) HOLDING A HYBRID ELECTRIC VEHICLE ON AN INCLINED SURFACE

(75) Inventors: Ihab S. Soliman, Warren, MI (US);
Andrew J. Silveri, Royal Oak, MI (US);
Deepak Aswani, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 470 days.

(21) Appl. No.: 11/843,688

(22) Filed: Aug. 23, 2007

(65) Prior Publication Data

US 2009/0054200 A1 Feb. 26, 2009

(51) Int. Cl.
*B60W 10/08* (2006.01)
(52) U.S. Cl. ................................. 477/5; 477/93; 477/98
(58) Field of Classification Search ...................... 477/5, 477/93, 97, 98
See application file for complete search history.

(56) References Cited

U.S. PATENT DOCUMENTS

| | | | | |
|---|---|---|---|---|
| 6,528,959 B2 * | 3/2003 | Kitano et al. | ................. | 318/55 |
| 6,755,489 B2 * | 6/2004 | Kuno et al. | ................. | 303/191 |
| 6,875,153 B2 * | 4/2005 | Jager et al. | ..................... | 477/71 |
| 7,309,941 B2 * | 12/2007 | Murota et al. | ................ | 310/268 |
| 2003/0085576 A1 | 5/2003 | Kuang et al. | | |

FOREIGN PATENT DOCUMENTS

| EP | 1826088 A2 | 8/2007 |
|---|---|---|
| JP | 2005073499 A * | 3/2005 |

\* cited by examiner

*Primary Examiner*—Ha D. Ho
(74) *Attorney, Agent, or Firm*—David B. Kelley; MacMillan, Sobanski & Todd, LLC

(57) ABSTRACT

A method for controlling a vehicle powertrain that includes a first power path including a first electric machine driveably connected to a first wheel set and a second power path including a second electric machine driveably connected to a second wheel set, including determining a desired wheel torque required to hold the vehicle stationary on an inclined surface, determining a temperature of the first machine and a first reference temperature, determining a torque capacity of the first power path, and using the first power path to produce the desired wheel torque, if the temperature of the first electric machine is less than the first reference temperature and the torque capacity of the first power path is greater than the desired wheel torque.

13 Claims, 9 Drawing Sheets

| PRIORITY | HEV HILL-HOLD STATE | CONDITIONS |
|---|---|---|
| 1ST | Mode 2: CISG+Transmission | • CISG max temperature not reached<br>• CISG available max torque capable of meeting torque for vehicle hill-hold |
| 2ND | Mode 3: CISG+Transmission+ERAD | • CISG max temperature not reached<br>• ERAD max temperature not reached<br>• CISG alone not capable of meeting hill-hold torque<br>• CISG+ERAD available max torques are capable of meeting hill-hold torque |
| 3RD | Mode 1: ERAD only | • CISG max temperature reached<br>• ERAD max temperature not reached<br>• ERAD available max torque capable of meeting desired wheel torque for vehicle hill-hold |

FIG. 6

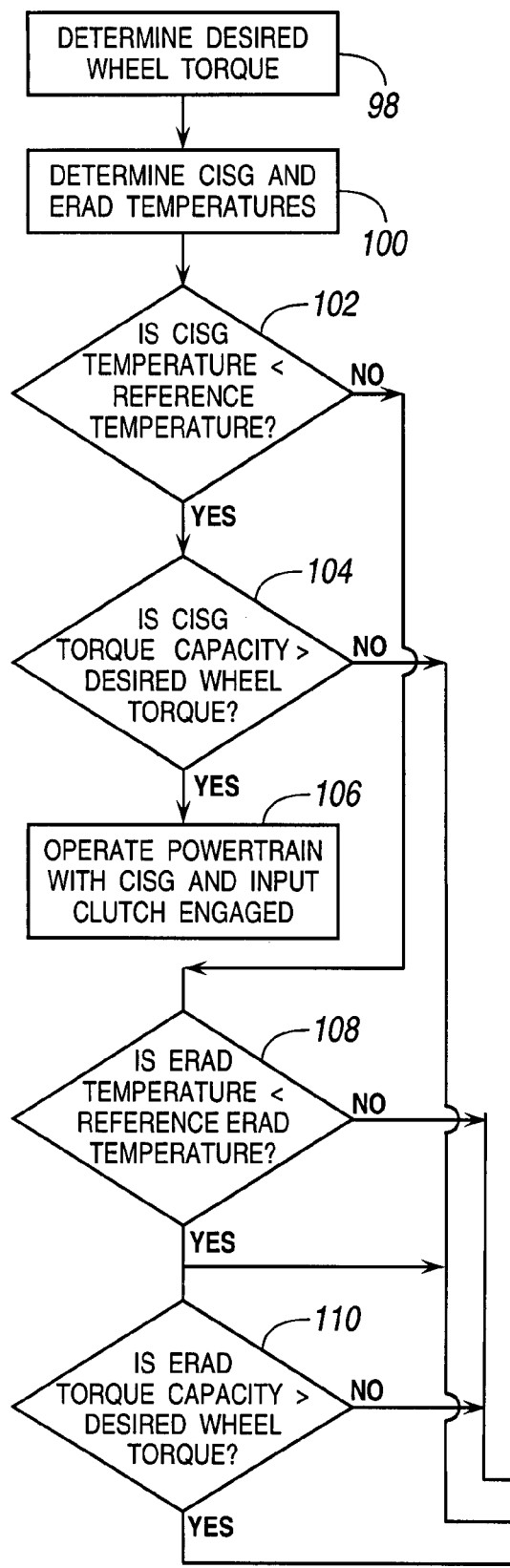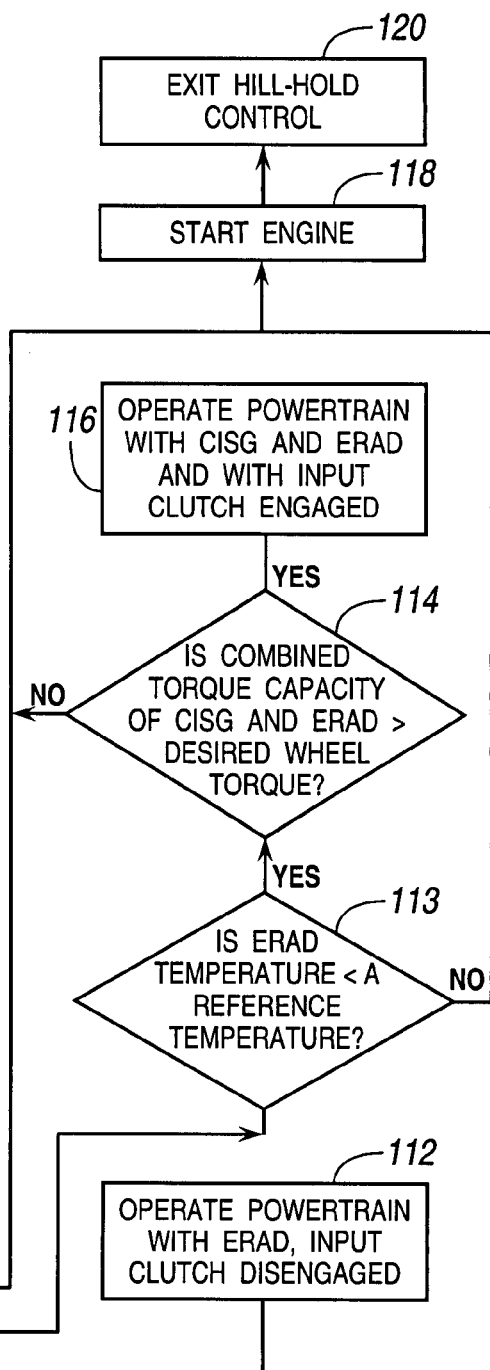
FIG. 8

HOLDING A HYBRID ELECTRIC VEHICLE ON AN INCLINED SURFACE

BACKGROUND OF THE INVENTION

1. Field of the Invention

This invention relates generally to a powertrain for a hybrid electric vehicle having an engine and one or more electric machines and, in particular, to controlling torque transmitted to the drive wheels when the vehicle is located on a hill and the engine is shutdown.

2. Description of the Prior Art

A powershift transmission is a geared mechanism that includes no torque converter, but instead employs two input clutches driveably connected to an engine crankshaft. A powershift transmission produces multiple gear ratios in forward and reverse drive and transmits power continuously using synchronized clutch-to-clutch shifts.

The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

During a vehicle creep condition with an increasing uphill road grade, the vehicle will eventually come to a stand-still condition due to the increased road load. At the point of stand-still for the given road grade, the vehicle is required to be stationary unless the driver tips into the accelerator pedal. While the vehicle is "holding" it should not roll backward at any point unless the road grade further increases beyond the stand-still point. The road grade at which vehicle stand-still ("hill-hold") should occur is specified as a vehicle performance requirement and can vary by manufacturer or vehicle model.

In a conventional vehicle equipped with a powershift transmission, because there is no torque converter, the necessary engine torque for vehicle hill-hold is transferred to the vehicle wheels by slipping the appropriate input clutch.

The vehicle can be held on a hill using a powershift transmission for only a limited period due to degradation in clutch torque transfer capacity as the thermal limits of the clutch are reached while the clutch is slipping. The thermal capacity of the clutch also limits hill-holding to lower road grades.

If the vehicle rolls back during a hill-hold condition due to degrading clutch torque transfer with increasing clutch temperature, the vehicle operator will eventually tip-in to the accelerator pedal or begin using the wheel brakes to keep vehicle stationary on the hill.

Furthermore, the vehicle can roll-back when the driver tips-in to the accelerator pedal when transitioning from a hill-hold condition to a forward moving condition on a grade.

When the operator tips-in to accelerator pedal in order to keep the vehicle in a hill-hold, the required clutch torque capacity is increased while the vehicle is stopped, which further degrades clutch durability since the clutch is also slipping.

In a hybrid electric vehicle equipped with a powershift transmission, vehicle hill-hold can be challenging when considering the added powertrain operating modes, particularly conditions in which the engine is shut down.

There is a need in the industry for a control strategy that uses, during engine shutdown conditions, additional power or torque sources and the function of the transmission to provide vehicle hill-hold.

SUMMARY OF THE INVENTION

A method for controlling a vehicle powertrain that includes a first power path including a first electric machine driveably connected to a first wheel set and a second power path including a second electric machine driveably connected to a second wheel set, including determining a desired wheel torque required to hold the vehicle stationary on an inclined surface, determining a temperature of the first electric machine and a first reference temperature, determining a torque capacity of the first power path, and using the first power path to produce the desired wheel torque, if the temperature of the first electric machine is less than the first reference temperature and the torque capacity of the first power path is greater than the desired wheel torque.

The control method provides vehicle hill-holding during engine shutdown conditions and maximizes the length of the hill-holding period by limiting electric machine overheating and using the available electric machines when needed.

The control method provides vehicle hill-holding in both forward and reverse drive directions while the engine is shutdown. No accelerator pedal tip-in is required for vehicle hill-holding using the control.

The control method takes advantage of transmission torque multiplication & the ability to fully engage the transmission input clutch while the engine is shutdown.

It reduces the torque required to be produced by electric machines while providing hill-hold function, and it is applicable to any hybrid electric vehicle (HEV) powertrain configuration that includes a fixed-ratio transmission.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 6 is a chart that summarizes the operating modes and conditions of the powertrain of FIG. 1 during vehicle hill-hold while the engine is shutdown;

FIG. 8 is a diagram illustrating the vehicle hill-hold control method steps.

DESCRIPTION OF THE PREFERRED EMBODIMENT

Figure 1:
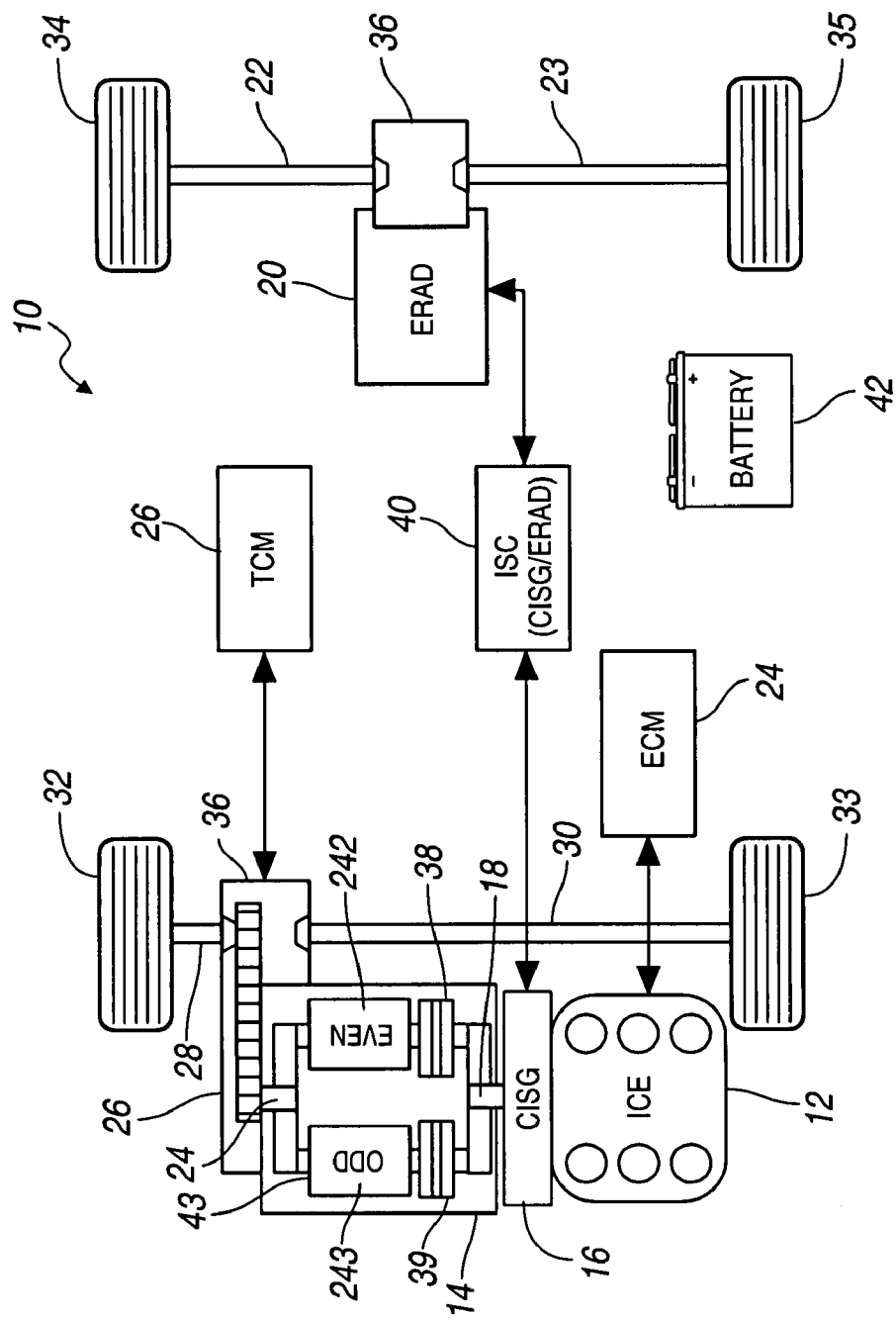
FIG. 1 is a schematic diagram showing an automotive vehicle powertrain for a hybrid electric vehicle.
Figure 2:
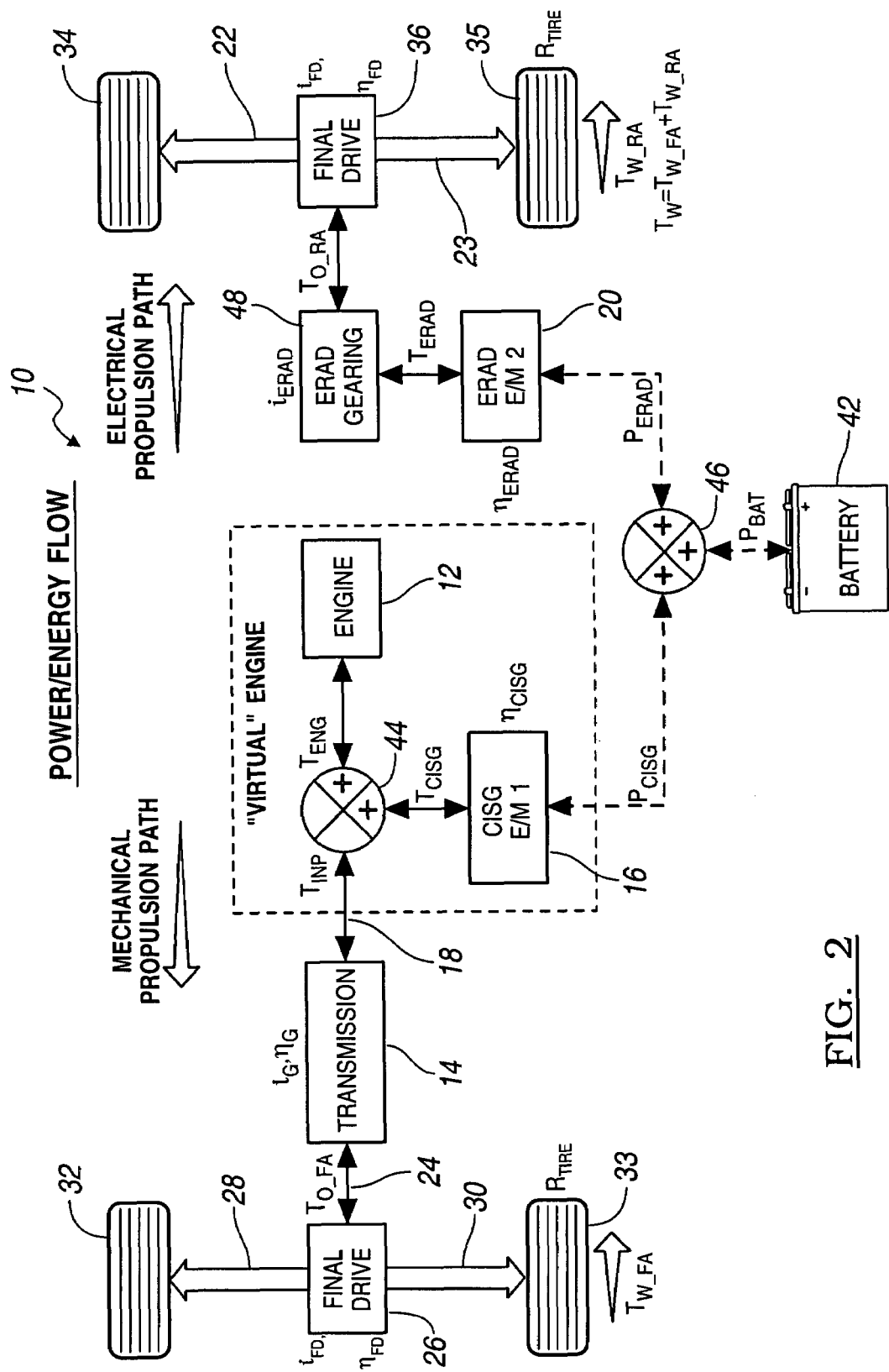
FIG. 2 a schematic diagram showing propulsion power flow for the powertrain of FIG. 1.

Referring first to FIGS. 1 and 2, the powertrain 10 configuration includes a first power source such as an internal combustion engine, a diesel engine or a gasoline engine; a power transmission 14 driveably for producing multiple forward and reverse gear ratios, such as a wet-clutch powershift transmission; an electric machine 16 driveably connected to the engine crankshaft and transmission input 18, such as a crankshaft-integrated starter/generator (CISG) for providing starter/generator capability; and an additional electric machine 20 driveably connected to a rear axle differential mechanism 36, such as an electric rear axle drive (ERAD), for providing additional propulsion capability in either an electric drive or hybrid drive mode. The transmission output 24 is connected through a final drive unit and differential mechanism 26 to the front axles 28, 30, which drive the front wheels 32, 33, respectively. ERAD 20 drives the rear wheels 34, 35 through ERAD gearing 48, a differential mechanism 36, rear axles 22, 23 and wheels 34, 35.

The powertrain 10 comprises a first power path driveably connected to the load that includes CISG 16, transmission 14, final drive unit 26, axles 28, 30 and the wheels 32, 33. A gear of the transmission must be engaged between input 18 and output 24 and the input clutch 38 or 39 that is associated with the engaged gear must be engaged to complete a drive path between CISG 16 and the vehicle wheels 32, 33. Powertrain 10 also comprises a second power path driveably connected to the load that includes ERAD 20, ERAD gearing 48, a differential mechanism 36, rear axles 22, 23 and wheels 34, 35.

An electronic engine control module (ECM) 24 controls operation of engine 12. An electronic transmission control module (TCM) 26 controls operation of transmission 14 and the input clutches 38, 39. An integrated starter controller (ISC) 40 controls operation of CISG 16, ERAD 20 and the system for charging an electric storage battery 42, which is electrically coupled to the electric machines 16, 20.

FIG. 2 shows the power and energy flow paths from the power sources 12, 16, 20 to the load at the vehicle wheels 32-35. Power produced by engine 12 and power produced by CISG 16 is combined at 44 and is transmitted to the transmission input 18. Electric power produced by both electric machines 16, 20 is combinable at 46 for charging the battery 42, or is transmitted from the battery to the electric machines. Mechanical power produced by ERAD 20 is transmitted through ERAD gearing 48 to the load at the rear wheels 34, 35 through the rear final drive 36.

Figure 3:
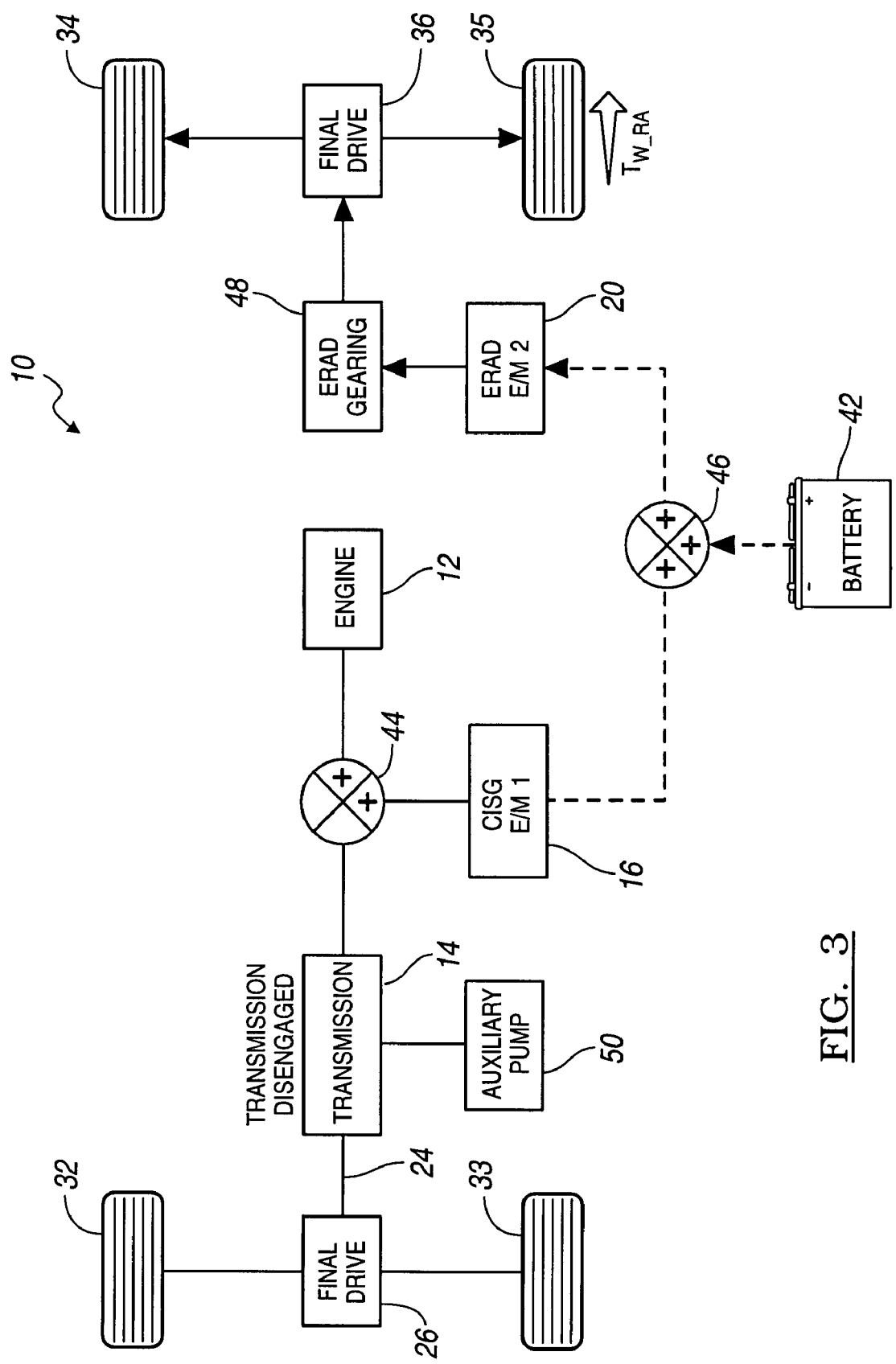
FIG. 3 is a schematic diagram showing the power flow for the powertrain of FIG. 1 operating in a first mode.
Figure 4:
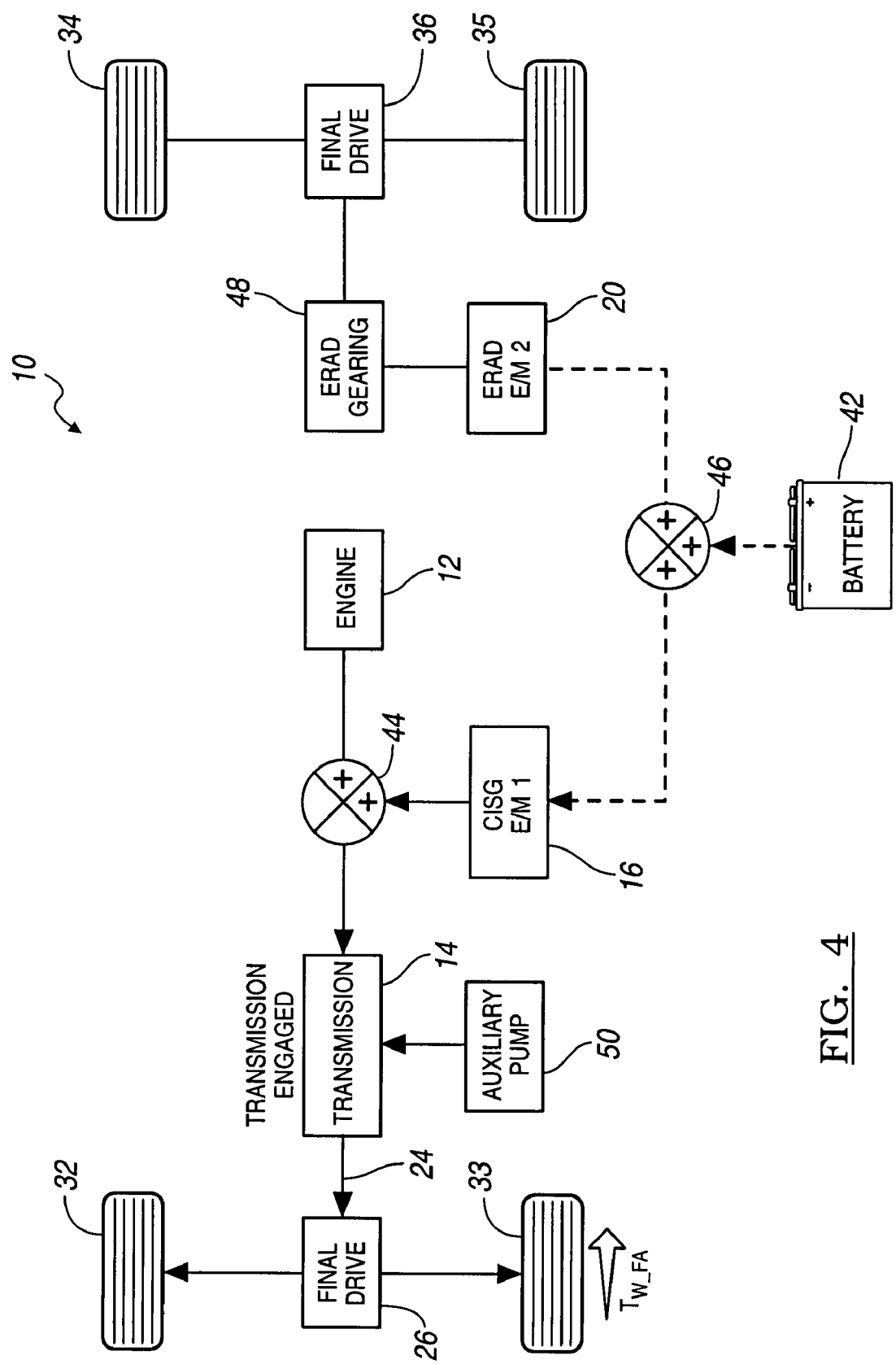
FIG. 4 is a schematic diagram showing the power flow for the powertrain of FIG. 1 operating in a second mode.
Figure 5:
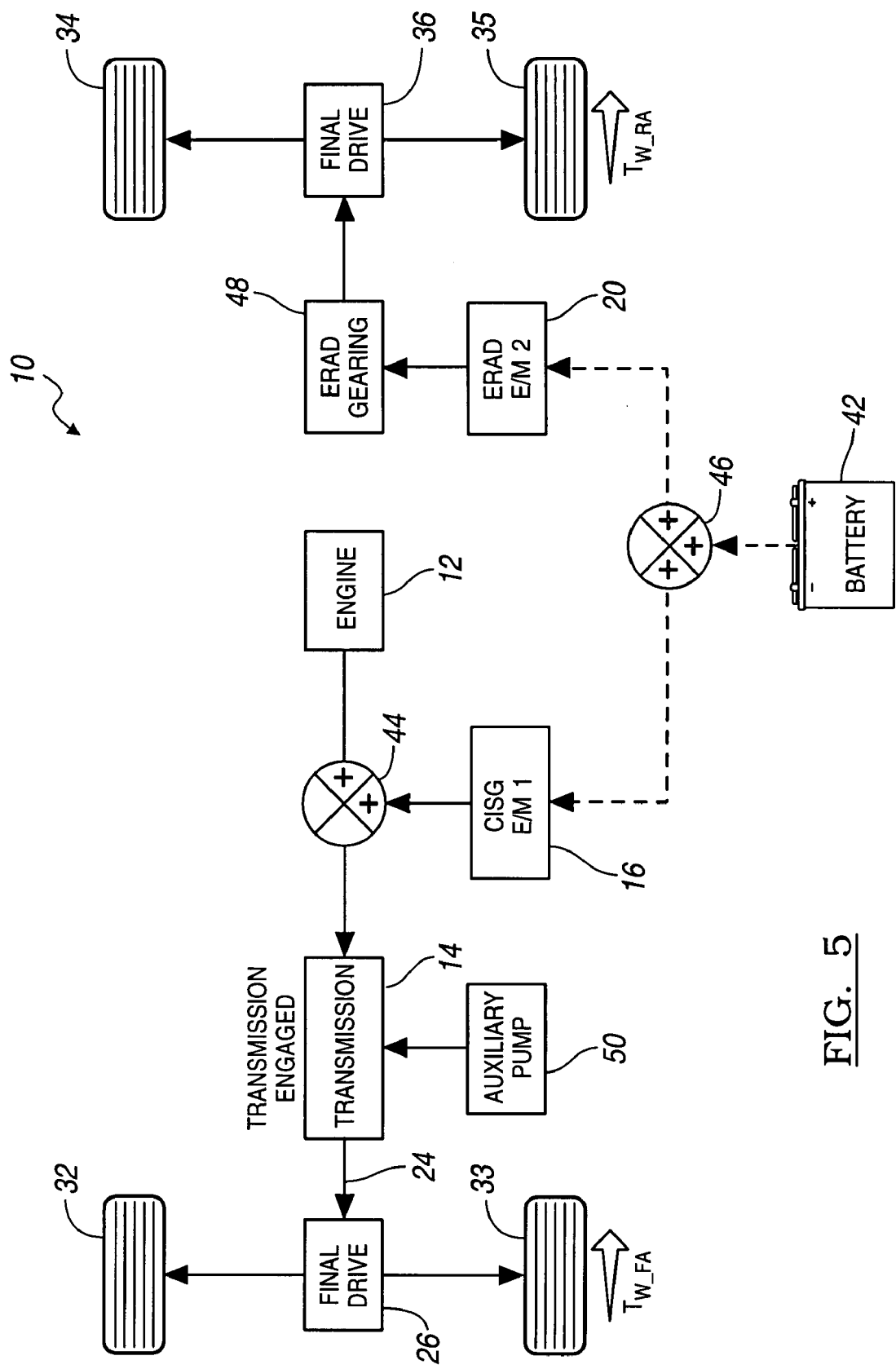
FIG. 5 is a schematic diagram showing the power flow for the powertrain of FIG. 1 operating in a third mode.

While the engine is shutdown, the HEV vehicle hill-hold control strategy uses the torque multiplication provided by the transmission and employs both electric machines 16, 20 to maximize the duration of hill-holding capability without damaging or reducing the life of the various components. Referring now to FIGS. 3-6, the hill-hold control strategy uses three operating states of powertrain 10 when the engine 12 is shutdown. In a first mode, as FIG. 3 illustrates, ERAD 20 only provides power to the rear wheels 34, 35 and the transmission is disengaged, such that the vehicle is held on a hill primarily by electric power. In a second mode, as FIG. 4 illustrates, CISG 16 provides power to the front wheels 32, 33 through transmission 14, which is operating in a gear with the corresponding input clutch 38 or 39 fully engaged, i.e., neither slipping nor open. In a third mode, as FIG. 5 illustrates, ERAD 20 provides power to the rear wheels 34, 35 and CISG 16 provides power to the front wheels 32, 33 through transmission 14, which is operating in a gear with the corresponding input clutch 38 or 39 fully engaged, i.e., neither slipping nor open.

Hydraulic pressure and flow to the transmission input clutch 38, 39 and gear engagement mechanism that corresponds to transmission gear engaged while hill-holding with the engine 12 shutdown is supplied by an electric auxiliary pump 50. Hydraulic pressure is provided by the engine only when it is running, thus the electric auxiliary pump controls hydraulic pressure during engine shutdown conditions. The CISG 16 and torque multiplication provided by the transmission 14 are used for vehicle hill-holding in the second and third operating modes, as shown in FIGS. 4 and 5. The motor torque required to hold the vehicle on a given road grade can be lower in the second and third modes compared to using the ERAD 20 directly for hill-holding because the CISG 16 is connected to the transmission input and CISG torque will be amplified by the transmission gear ratio. Since the required electric machine torque is lower, the rate of motor temperature increase is lower thereby increasing the length of the period during which hill-hold torque is provided by the electric machines 16, 20. When operating in the third mode as shown in FIG. 5, the control strategy shifts the power source for hill-holding between the CISG 16 and ERAD 20 while the transmission is engaged in order to limit overheating of the motors. Moreover, on severe road grades, the third mode is used to provide maximum hill-holding capability while the engine is shutdown compared to using ERAD 20 alone, as in the first mode.

In order to select the appropriate hill-hold operating mode or state during an engine shutdown condition, the control strategy uses a priority technique, such as that set forth in FIG. 6, in which it is assumed that the engine 12 is shutdown and the state of charge of battery 42 has not reached a reference magnitude at which the engine is restarted automatically.

If none of the conditions are met for operating in one of the three hill-holding modes during engine shutdown, the engine 12 is restarted in order to provide vehicle hill-holding wheel torque.

Figure 7:
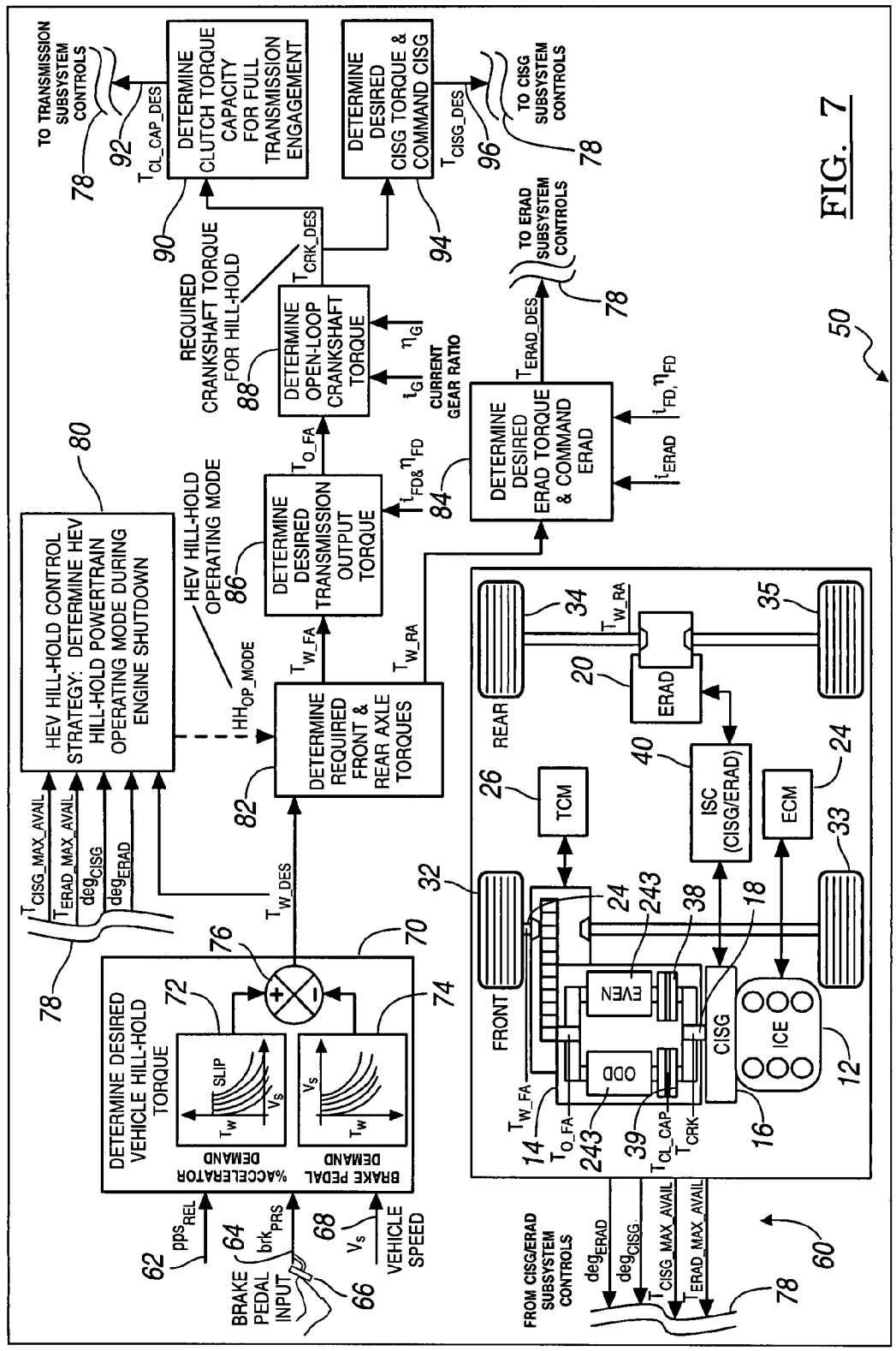
FIG. 7 is a schematic diagram illustrating a hill-hold controller.

FIG. 7 illustrates a hill-hold controller 50 including an electronic microprocessor, accessible to electronic memory containing stored functions, variables, and control algorithms, such as those described with reference to FIG. 8, and electronic signals produced by various sensors representing operating parameters and variables of the vehicle, engine 12, CISG 16, ERAD 20, transmission 14, input clutches 38, 39, ERAD gearing 48 and front/rear final drive units and differential mechanisms 26 and 36, CISG and ERAD temperature sensors, a vehicle speed sensor, accelerator pedal position sensor, brake pedal pressure sensor or alternatively brake pedal position sensor. The microprocessor executes the algorithms and produces control commands to which the CISG 16 and ERAD 20 respond by producing torque, and the transmission 18 responds by engage and disengaging input clutches 38, 39 and alternately engaging a forward gear or reverse gear.

The vehicle operator's demand for wheel torque is represented by the degree to which the accelerator pedal 62 and brake pedal 66 are depressed. An electronic signal, $pps_{REL}$, representing the accelerator pedal position 62, produced by a sensor in response to depression of the accelerator pedal; an electronic signal, $brk_{PRS}$, representing the brake pressure 64 produced by a sensor in response to depressing the brake pedal 66; and an electronic signal representing the current vehicle speed 68 produced by a shaft speed sensor, are received as input by a desired vehicle hill-hold torque function 70. Function 70 accesses in electronic memory a first function 72, which produces a desired wheel torque when indexed by vehicle speed 68 and accelerator pedal position 62, and a second function 74, which produces a desired wheel torque indexed by vehicle speed and brake pressure 64. At the summing junction 76, the magnitude of the current net desired wheel torque $T_{W\_DES}$ currently required for hill-holding the vehicle is produced from the wheel torque outputs produced by functions 72 and 74. It is important to note that the vehicle should hill-hold without requiring the vehicle operator depressing the accelerator pedal to demand additional wheel torque i.e. without accelerator pedal tip-in. Also note that when both accelerator and brake pedals are not depressed, the desired wheel torque will be positive and will be reduced with increasing vehicle speed to provide hill-hold. On level ground with no pedal inputs, this positive desired wheel torque provides vehicle creep.

The CISG & ERAD temperatures and available maximum torque magnitudes determined at 60 and the desired hill-hold wheel torque determined at 76 are supplied as inputs via a data bus 78 to a HEV hill-hold control strategy 80, which determines the correct hill-hold operating mode $HH_{OP\_MODE}$ using the criteria of FIG. 6 while engine 12 is shutdown.

The desired torques $T_{W\_FA}$, $T_{W\_RA}$ of the front axle 28, 30 and rear axle 22, 23 are determined respectively at 82 upon reference to the correct hill-hold operating mode $HH_{OP\_MODE}$ and current net desired wheel torque $T_{W\_DES}$.

The desired ERAD torque is determined at 84 upon reference to the desired rear axle torque $T_{W\_RA}$, and a command for the desired ERAD torque is carried on bus 78 to the integrated starter controller (ISC) 40, which responds to the command by regulating the magnitude of electric current to ERAD 20 to the current that produces the desired ERAD torque.

Similarly, the desired transmission output torque $T_{O\_FA}$ is determined at 86 upon reference to the desired front axle torque $T_{W\_FA}$.

The desired transmission output torque $T_{O\_FA}$ and the transmission gear ratio $i_G$ produced by the current gear are used by a function 88 to determine the required hill-hold crankshaft torque $T_{CRK\_DES}$.

The torque capacity of the input clutch 38, 39 associated with the current transmission gear ratio $i_G$ is determined at 90 from the required hill-hold crankshaft torque $T_{CRK\_DES}$. A command $T_{CL\_CAP\_DES}$ 92 for the torque capacity of the relevant input clutch 38, 39 issues, and the TCM 26 controls the input clutch torque to achieve the commanded torque capacity $T_{CL\_CAP\_DES}$. In order to engage the transmission, the input clutch torque is controlled such that it becomes equal to or greater than the required hill-hold crankshaft torque $T_{CRK\_DES}$.

The desired CISG torque $T_{CISG\_DES}$ is determined at 94 from the required hill-hold crankshaft torque $T_{CRK\_DES}$. A command 96 to produce the desired CISG torque is carried on bus 78 to the ISC 40, which responds to the command 96 by controlling the magnitude of electric current supplied to the CISG 16 such that the desired CISG torque is produced.

The steps of the hill-hold control method are shown in FIG. 8. At step 98 the desired wheel torque during a hill-hold condition with the engine shutdown is determined. At step 100 the current CISG and ERAD temperatures are determined.

At step 102, a test is made to determine whether the CISG temperature is lower than the reference CISG temperature (deg_CISG<MAXDEG_CISG). If the result of test 102 is logically true, control advances to step 104. If the result of test 102 is false, control advances to step 108.

At step 104, a test is made to determine whether the available CISG torque capacity is greater than the required wheel torque for vehicle hill-holding. If the result of test 104 is true, at step 106 the powertrain operates in the second mode, i.e., with torque being provided by the CISG 16 and the relevant input clutch 38, 39 fully engaged with the transmission engaged in gear. If the result of test 104 is false, control advances to step 113 since the CISG alone is not capable of providing the required wheel torque for hill-hold.

At step 108, since the CISG has reached a maximum thermal limit, a test is made to determine whether the ERAD temperature is lower than the reference ERAD temperature (deg_ERAD<MAXDEG_ERAD). If the result of test 108 is logically true, control advances to step 110. If the result of test 108 is false, control advances to step 118.

At step 110, a test is made to determine whether the available ERAD torque capacity is greater than the required wheel torque for vehicle hill-holding. If the result of test 110 is true, at step 112 the powertrain operates in the first mode, i.e., with torque being provided by the ERAD 20. The input clutches 38, 39 may be fully disengaged. If the result of test 110 is false, control advances to step 118.

At step 113 a test is made to determine whether the ERAD temperature is lower than the reference ERAD temperature (deg_ERAD<MAXDEG_ERAD). If the result of test 113 is logically true, control advances to step 114. If the result of test 113 is false, control advances to step 118.

At step 114, a test is made to determine whether the available combined torque capacity of the CISG 16 and ERAD 20 is greater than the required wheel torque for vehicle hill-holding. If the result of test 114 is true, at step 116 the powertrain operates in the third mode, i.e., with torque being provided by both ERAD 20 and CISG 16 and the relevant clutch 38, 39 is fully engaged with the transmission engaged in gear. If the result of test 114 is false, control advances to step 118.

At step 118, the engine 12 is restarted since vehicle hill-hold can no longer be provided while engine is shutdown independent of the battery SOC. Either both CISG 16 and ERAD 20 have overheated, or the required wheel torque for vehicle hill-hold cannot be provided, or both of these are true.

At step 120 the hill-hold control is exited.

Figure 9:
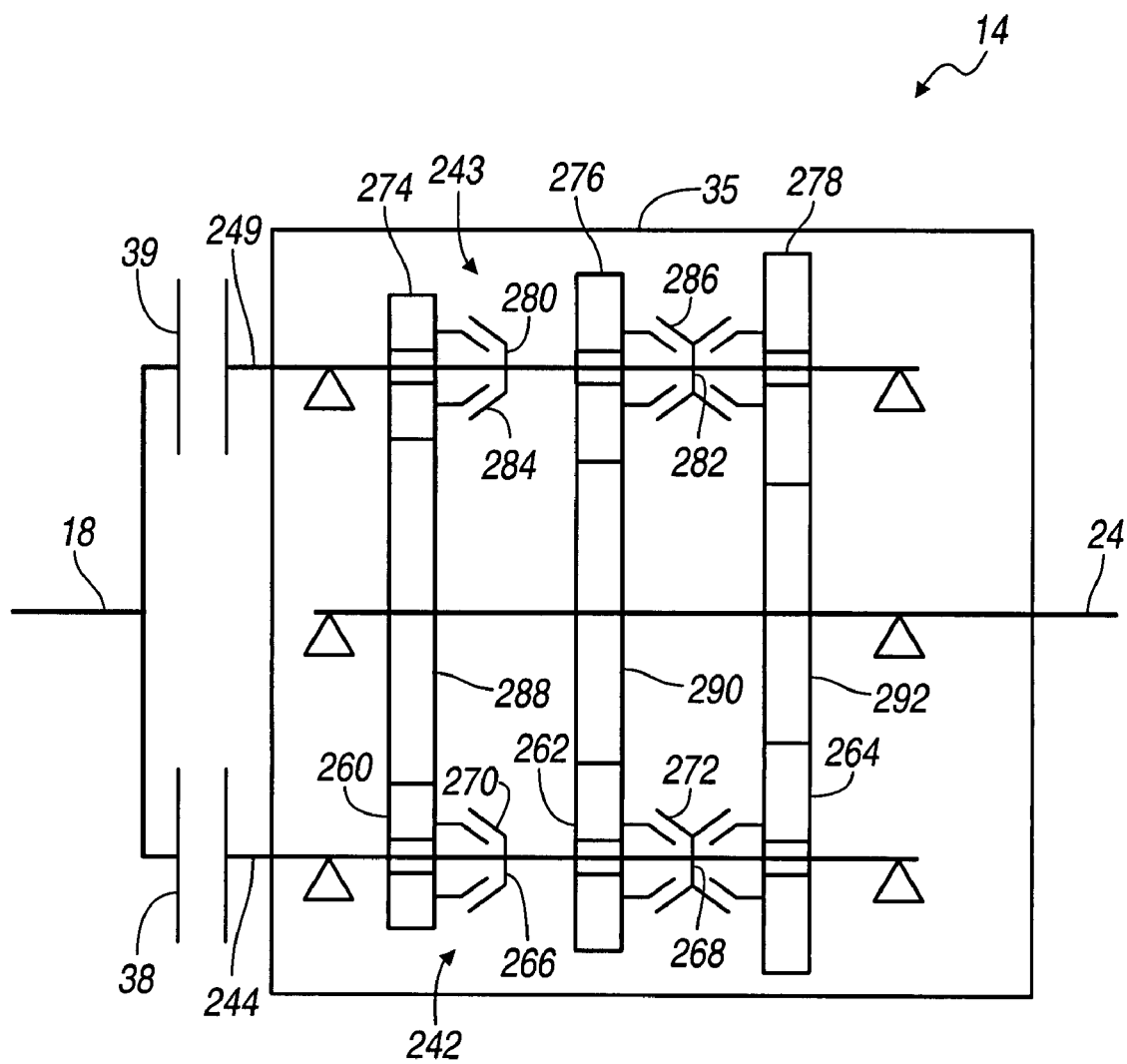
FIG. 9 is a schematic diagram showing details of a power-shift transmission.

FIG. 9 illustrates details of a powershift transmission 14 that includes the first input clutch 38, which selectively connects the input 18 of the transmission alternately to the even-numbered gears 242 associated with a first layshaft 244, and a second input clutch 39, which selectively connects the input 18 alternately to the odd-numbered gears 243 associated with a second layshaft 249.

Layshaft 244 supports pinions 260, 262, 264, which are each journalled on shaft 244, and couplers 266, 268, which are secured to shaft 244. Pinions 260, 262, 264 are associated respectively with the second, fourth and sixth gears. Coupler 266 includes a sleeve 270, which can be moved leftward to engage pinion 260 and driveably connect pinion 260 to shaft 244. Coupler 268 includes a sleeve 272, which can be moved leftward to engage pinion 262 and driveably connect pinion 262 to shaft 244 and can be moved rightward to engage pinion 264 and driveably connect pinion 264 to shaft 244.

Layshaft 249 supports pinions 274, 276, 278, which are each journalled on shaft 249, and couplers 280, 282, which are secured to shaft 249. Pinions 274, 276, 278 are associated respectively with the first, third and fifth gears. Coupler 280 includes a sleeve 284, which can be moved leftward to engage pinion 274 and driveably connect pinion 274 to shaft 249.

Coupler 282 includes a sleeve 286, which can be moved leftward to engage pinion 276 and driveably connect pinion 276 to shaft 249 and can be moved rightward to engage pinion 278 and driveably connect pinion 278 to shaft 249.

Transmission output 24 supports gears 288, 290, 292, which are each secured to shaft 32. Gear 288 meshes with pinions 260 and 274. Gear 290 meshes with pinions 262 and 276. Gear 292 meshes with pinions 264 and 278.

Couplers 266, 268, 280 and 282 may be synchronizers, or dog clutches or a combination of these. The hill-hold strategy also applies if the vehicle is moving backward on a road inclined upward, i.e. the vehicle is initially creeping backward going up a road grade then having to hill-hold. The same strategy would be used. If the transmission 14 is engaged, it would be engaged in reverse gear. If the CISG 16 is used (as in modes 2 and 3 shown in FIGS. 4 and 5), the CISG would be producing positive torque (as in the forward driving mode) since the transmission is in a reverse gear. If the ERAD is used, it would be producing a negative wheel torque for hill-hold.

In accordance with the provisions of the patent statutes, the preferred embodiment has been described. However, it should be noted that the alternate embodiments can be practiced otherwise than as specifically illustrated and described.

What is claimed is:

1. In a vehicle powertrain that includes a first power path including a first electric machine driveably connected to first wheel set and a second power path including a second electric machine driveably connected to a second wheel set, a method for holding the vehicle on an inclined surface comprising the steps of:
   (a) determining a desired magnitude of wheel torque required to hold the vehicle stationary on the inclined surface;
   (b) using the desired magnitude of wheel torque, an available torque capacity of the first power path and an available torque capacity of the second power path to determine a desired power path or a desired combination of the power paths to produce the desired magnitude of wheel torque; and
   (c) operating the electric machine of the desired power path or the electric machines of the desired combination of the power paths to produce the desired magnitude of wheel torque.

2. The method of claim 1 wherein step (a) further comprises the step of using a vehicle speed and a brake pressure to determine the desired magnitude of wheel torque.

3. The method of claim 1 wherein step (a) further comprises the step of using a vehicle speed, accelerator pedal depression and brake pedal depression to determine the desired magnitude of wheel torque.

4. The method of claim 1 further comprising the steps of:
   using the available torque capacity of the desired power path or the available torque capacity of the desired combination of the power paths, and the desired magnitude of wheel torque to determine a desired magnitude of front wheel torque and a desired magnitude of rear wheel torque required to hold the vehicle stationary on the inclined surface;
   determining a desired crankshaft torque corresponding to the desired magnitude of front wheel torque; and
   operating the electric machine of the desired power path or the electric machines of the desired combination of the power paths to produce the desired magnitude of crankshaft torque and the desired magnitude of rear wheel torque.

5. In a vehicle powertrain that includes a first power path including a first electric machine driveably connected to a wheel set and a second power path including a second electric machine driveably connected to the wheel set, a method for holding the vehicle on an inclined surface comprising the steps of:
   (a) determining a desired magnitude of wheel torque required to hold the vehicle stationary on the inclined surface;
   (b) using the desired magnitude of wheel torque, an available torque capacity of the first power path and an available torque capacity of the second power path to determine a desired power path or a desired combination of the power paths to produce the desired magnitude of wheel torque; and
   (c) operating the electric machine of the desired power path or the electric machines of the desired combination of the power paths to produce the desired magnitude of wheel torque.

6. In a vehicle powertrain that includes a first power path including a first electric machine driveably connected to a wheel set and a second power path including a second electric machine driveably connected to the wheel set, a method for holding the vehicle on an inclined surface comprising the steps of:
   (a) determining a desired magnitude of wheel torque required to hold the vehicle stationary on the inclined surface;
   (b) using the desired magnitude of wheel torque, a temperature and an available torque capacity of the first electric machine, and a temperature and an available torque capacity of the second electric machine to determine a desired power path or a desired combination of the power paths to produce the desired magnitude of wheel torque; and
   (c) operating the electric machine of the desired power path or the electric machines of the desired combination of the power paths to produce the desired magnitude of wheel torque.

7. A method for holding a vehicle on an inclined surface using a powertrain that includes a first power path including a first electric machine driveably connected to a first wheel set through a transmission that includes a gear and an input clutch associated with the gear, and a second power path including a second electric machine driveably connected to a second wheel set, comprising the steps of:
   determining a desired wheel torque required to hold the vehicle stationary on the surface;
   determining a temperature of the first machine and a first reference temperature;
   determining a torque capacity of the first electric machine;
   if the temperature of the first electric machine is less than the first reference temperature and the torque capacity of the first electric machine is greater than the desired wheel torque, using the first power path with the input clutch engaged and the gear engaged to produce the desired wheel torque.

8. The method of claim 7, further comprising the steps of:
   determining a temperature of the second machine and a second reference temperature;
   determining an available torque capacity of the second electric machine;
   if the temperature of the first electric machine is equal to or greater than the first reference temperature, the temperature of the second electric machine is less than the second reference temperature, and the torque capacity of the second electric machine is greater than the desired wheel torque, using the second power path to produce the desired wheel torque.

9. The method of claim 7, further comprising the steps of:
if the temperature of the first electric machine is greater than the first reference temperature, and the temperature of the second electric machine is greater than the second reference temperature, or the combined torque capacity of the first electric machine and second electric machine is less than or equal to the desired wheel torque, discontinuing use of the first electric machine and the second electric machine; and
using the engine with the input clutch slipping and the gear engaged to produce the desired wheel torque.

10. The method of claim 7, further comprising the step of using the first power path with the input clutch engaged and the gear engaged and second power path to produce the desired wheel torque if the temperature of the first electric machine is less than the first reference temperature, and the torque capacity of the first power path is less than or equal to the desired wheel torque, and the temperature of the second machine is less than the second reference temperature, and the combined torque capacity of the first electric machine and second electric machine is greater than the desired wheel torque.

11. A method for holding a vehicle on an inclined surface using a vehicle powertrain that includes a first power path including a first electric machine driveably connected to a wheel set and a second power path including a second electric machine driveably connected to the wheel set, comprising the steps of:
determining a desired wheel torque required to hold the vehicle stationary on the inclined surface;
determining a temperature of the first electric machine and a first reference temperature;
determining a torque capacity of the first electric machine; and
using the first power path to produce the desired wheel torque, if the temperature of the first electric machine is less than the first reference temperature and the torque capacity of the first power path is greater than the desired wheel torque
determining a temperature of the second electric machine and a second reference temperature;
determining a torque capacity of the second electric machine; and
if the temperature of the first electric machine is equal to or greater than the first reference temperature, and the temperature of the second machine is less than the second reference temperature, and the torque capacity of the second electric machine is greater than the desired wheel torque, using the second power path to produce the desired wheel torque.

12. The method of claim 11, further comprising the step of:
if the temperature of the first electric machine is less than the first reference temperature, and the torque capacity of the first electric machine is less than the desired wheel torque, and the temperature of the second machine is less than the second reference temperature, and the torque capacity of the second electric machine is less than the desired wheel torque, and the combined torque capacity of the first power path and second power path is greater than the desired wheel torque, using the first and second power paths to produce the desired wheel torque.

13. The method of claim 11, wherein the first power path includes an engine, the method further comprising the steps of:
if the temperature of the first electric machine is greater than the first reference temperature and the temperature of the second machine is greater than the second reference temperature, or the combined torque capacity of the first electric machine and second electric machine is less than or equal to the desired wheel torque, discontinuing use of the first electric machine and the second electric machine; and
using the engine and the first power path without using the first machine to produce the desired wheel torque.

* * * * *